June 21, 1949.　　　　A. P. WATERSON　　　　2,474,134
HYDRAULIC TOOL CONTROL UNIT
Filed April 24, 1947　　　　　　　　　　　　3 Sheets-Sheet 1
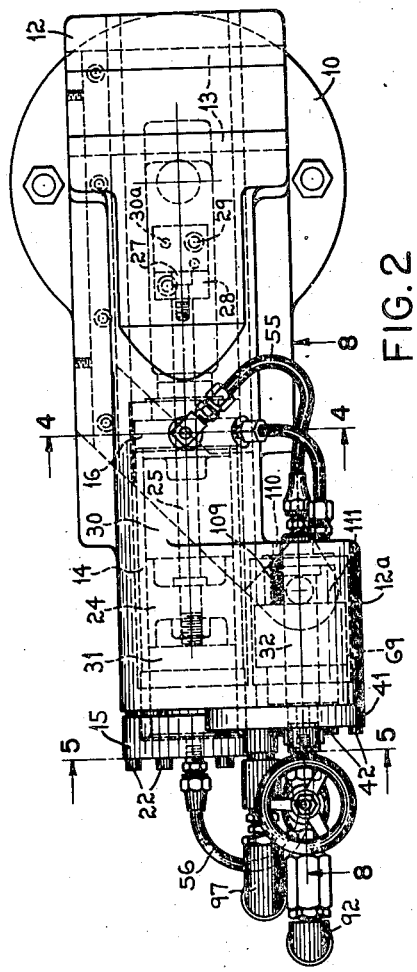
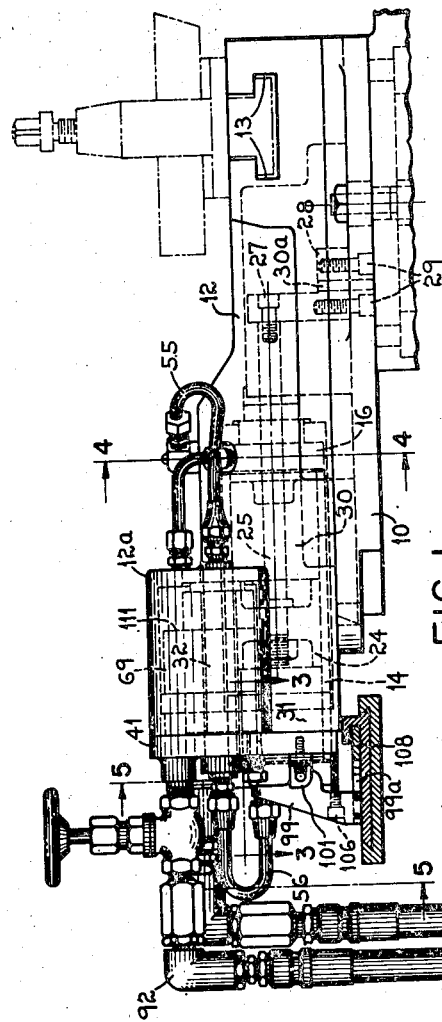
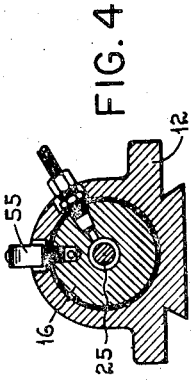
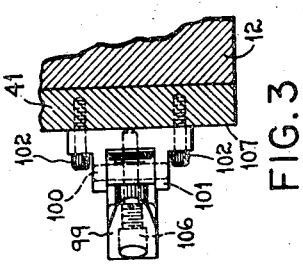
INVENTOR.
ARTHUR P. WATERSON
BY
Toulmin & Toulmin
ATTORNEYS.

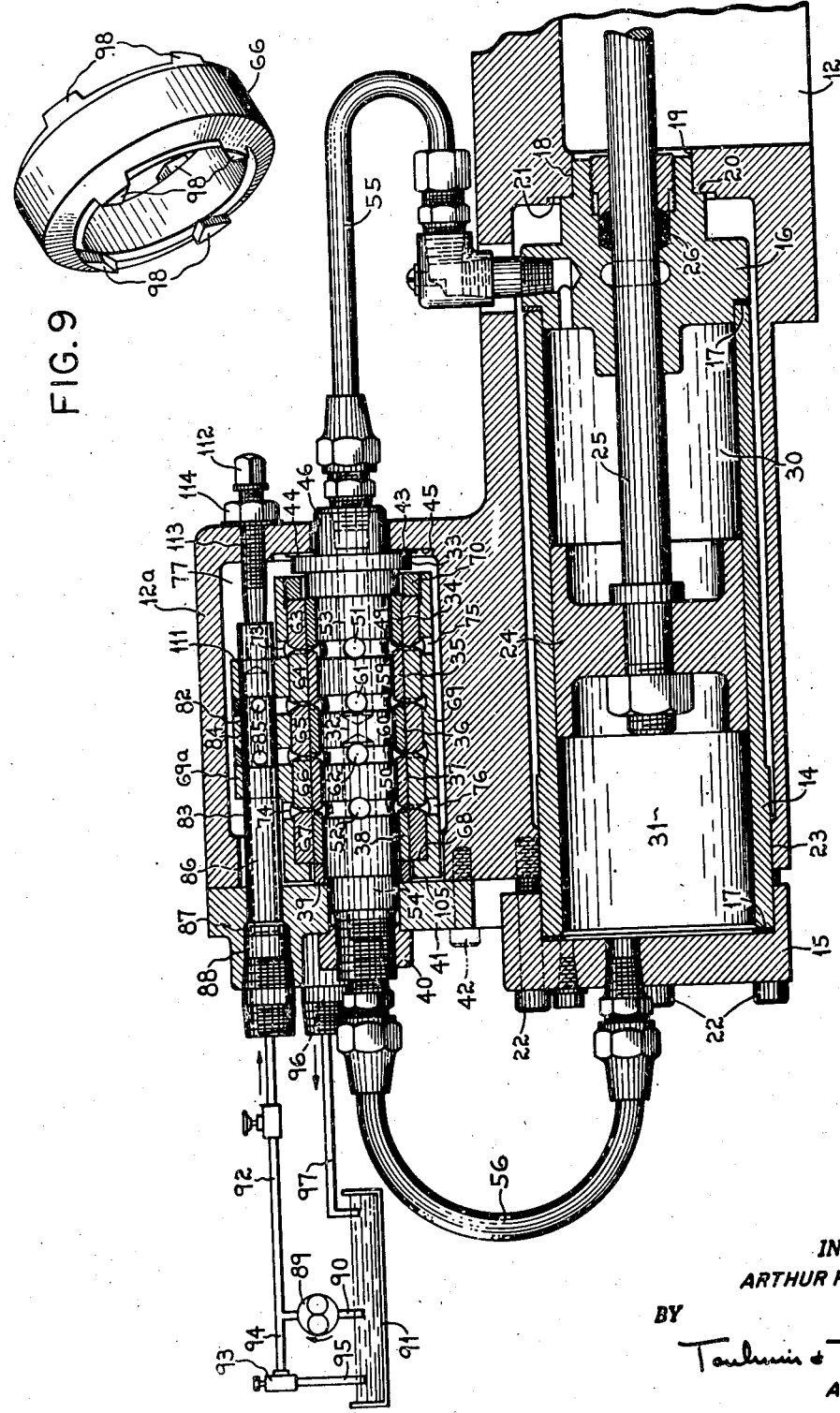

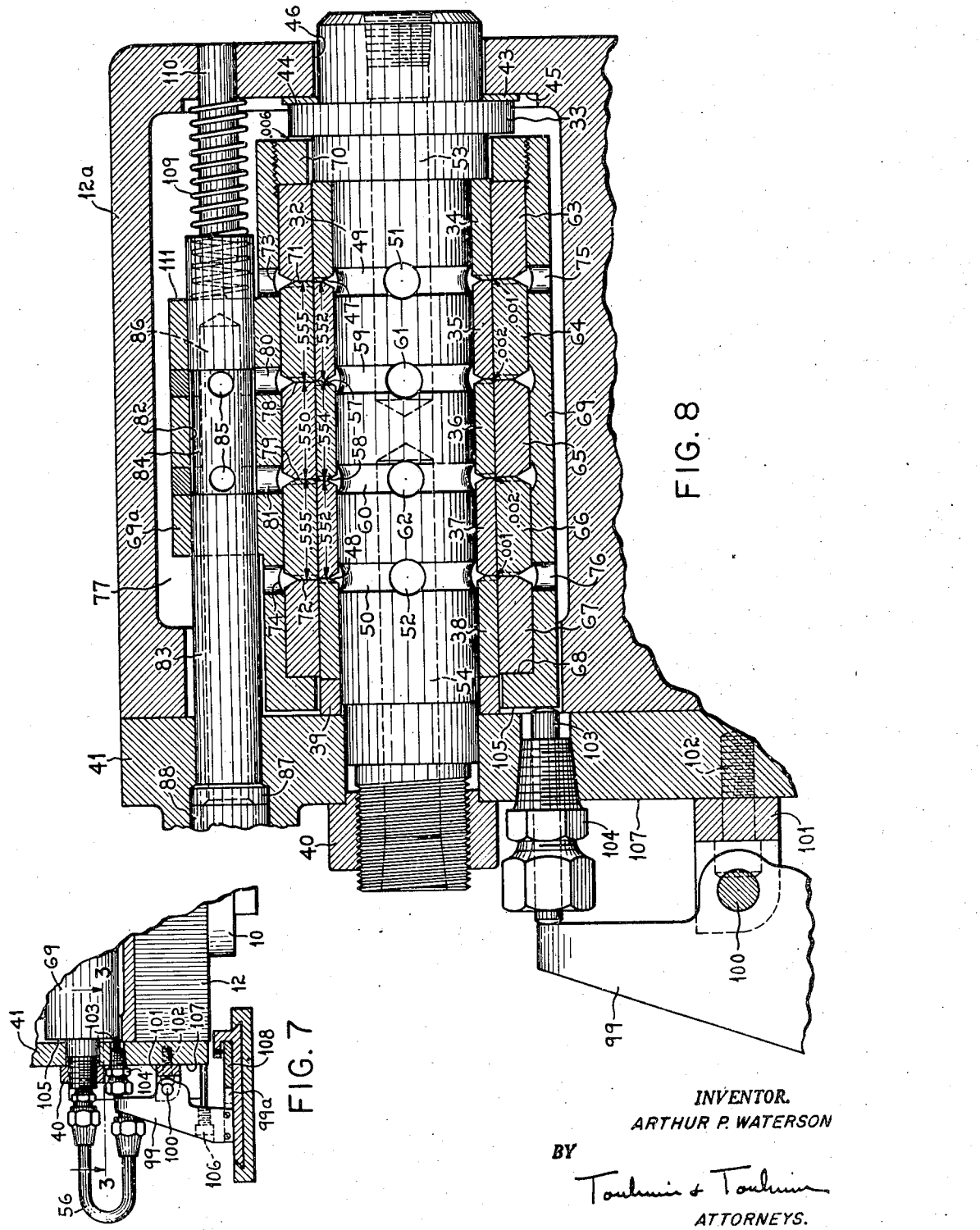

Patented June 21, 1949

2,474,134

UNITED STATES PATENT OFFICE 2,474,134

HYDRAULIC TOOL CONTROL UNIT

Arthur P. Waterson, Tulsa, Okla., assignor to The R. K. LeBlond Machine Tool Company, Cincinnati, Ohio, a corporation of Delaware Application April 24, 1947, Serial No. 743,669

3 Claims. (Cl. 121—41)

This invention pertains to an improved hydraulic actuating device for a tool carrier. More particularly, this invention is directed to a duplicating attachment for actuating the cutting tool of a machine tool.

One of the objects of this invention is to provide a duplicating attachment in which the actuating member for the tool slide, the tracer control valve, and the stylus are all contained in the same tool carrying device.

Still another object of this invention is to provide a duplicating attachment for lathe in which the actuating member, the control member, and the template actuated stylus are all mounted on the same tool carrying slide.

Still another object of this invention is to provide, in a hydraulic duplicating attachment for lathe, an arrangement which may be readily substituted for the compound rest and which is self-contained in that the hydraulic actuating cylinder, the servo control valve, and the stylus for actuating said valve are all contained in and carried on the tool slide actuated by operation of the tracer valve stylus.

Still another object of this invention is to provide, in a hydraulic duplicating attachment, a servo valve including a novel method of applying fluid pressure to the movable member of said valve from a fixed supply positioned on the tool slide of the attachment.

A still further object of this invention is to provide a duplicating attachment for lathe having a main tool slide casting which contains tool support, the hydraulic actuating cylinder, and the tracer valve, in an integral close-coupled unit.

Still another object of this invention is to provide a hydraulically actuated duplicating attachment for lathe in which a fluid pressure cylinder is utilized to actuate the tool slide and is carried in said slide, together with a tracer controlled valve for said cylinder mounted in but off to one side of said cylinder in the tool slide member.

Still another object of this invention is to provide an improved duplicating attachment for lathe in which the fluid pressure supply between the tracer controlled valve and the operating cylinder for the attachment is effected through rigid conduits having a minimum length and volumetric content.

Further features and advantages of this invention will appear from a detailed description of the drawings in which:

Figure 1 is a side elevation of a duplicating attachment incorporating the features of applicant's invention.

Figure 2 is a plan view of the attachment shown in Figure 1.

Figure 3 is a fragmentary view indicated by the line 3—3 in Figures 1 and 7.

Figure 4 is a section on the line 4—4 of Figures 1 and 2.

Figure 5 is an end view of the attachment on the line 5—5 of Figures 1 and 2.

Figure 6 is a diagrammatic section on the line 6—6 of Figure 5, particularly showing the hydraulic operating and control circuit.

Figure 7 is an enlarged sectional view on the line 7—7 of Figure 5.

Figure 8 is an enlarged section through the servo valve, particularly showing the control ports indicated by the line 8—8 in Figure 2.

Figure 9 is an isometric perspective view of one of the port forming collars of the control valve.

The duplicating attachment comprises a base member which may take the form of a swivel slide bottom 10 which may be attached to the tool carrier or cross slide of the lathe in place of the usual compound rest utilizing the same clamping and swivel mounting of well known character. On the swivel slide member is formed a pair of dovetailed guide surfaces 11, Figure 5, upon which is reciprocatably mounted the tool carrier or tool slide 12 which is preferably provided with the usual T slot 13 in which may be placed the usual lathe tool post, wedge, and clamping screw mechanism of well known character.

The tool slide 12 is reciprocated on the swivel base member 10 by means of a fluid pressure cylinder mounted rigidly to the tool slide 12 and which may take the form of a cylinder 14 having cylinder heads 15 and 16 engaging the ends of the cylinder in fluid tight connection by means of suitable packing 17. The head 16 is provided with a suitable diameter 18 nicely fitting in a bore 19 formed in the tool slide 12 and having an abutment surface 20 engaging a mating surface 21 of the tool slide 12. Through the head 15 passes a series of clamping bolts 22 which are threaded into the tool slide 12 and, when drawn up tightly, force the head 16 up against the surface 21 to securely hold the tube 14 between both of the heads 15 and 16 through the gaskets 17 to form a fluid tight actuating cylinder. The cylinder is supported at its outer end in a bore at the point 23 in the tool slide 12.

In the cylinder 14 is a piston 24 to which is connected the piston rod 25 passing through a suitable packing gland 26 in the cylinder head 16, the outer end of the piston rod being connected by the screw 27 to a bracket 28 secured to the swivel base 10 by suitable screws 29 and pins 30a so that when fluid pressure is applied in the chamber 30 of the cylinder, forward movement will be effected in the tool slide 12 and when pressure is applied in the rear chamber 31 of the cylinder behind the piston 24 a return movement will be effected in the tool slide 12.

Formed integral with the tool slide 12 is the servo valve housing 12a in which is carried the servo control valve for the fluid pressure cylinder comprising a valve spindle 32 having a flanged abutment surface 33 against which the series of port forming collars 34, 35, 36, 37, and 38 are firmly secured by the collar 39 when the lock nut 40, threaded on the end of the spindle 32, is tightened down to thereby hold the spindle 32 securely to the valve chamber cover cap 41 when the screws 42 are appropriately locked in place. A soft packing washer 43 engaging the outer face 44 of the flange portion 33 of the spindle 32 engages the inner face 45 of the valve body portion 12a to prevent leakage of discharge fluid out past the space 46 between the spindle 32 and the housing 12a. Between the collars 34 and 35 and 37 and 38 are formed the exhaust ports 47 and 48 which communicate with annular grooves 49 and 50, respectively, formed in the spindle 32 which in turn communicate with radial passageways 51 and 52 extending inwardly and communicating with the cylinder chamber passageways 53 and 54. The chamber 53 is connected through a suitable rigid conduit 55 to the chamber 30 of the cylinder 14 while the passageway 54 is connected through the rigid conduit 56 to the chamber 31 of the cylinder 14. It is to be understood, however, that drilled passageways formed directly in the valve housing portion 12a and tool slide 12 may be utilized to intercommunicate fluid pressure from the passageways 53 and 54 to the respective chambers 30 and 31 in the cylinder 14. Intake ports 57 and 58 between the collars 35 and 36 and 36 and 37 communicate with annular grooves 59 and 60 which in turn communicate through the radial passageways 61 and 62 with the passageways 53 and 54.

In this way, relatively short rigid fluid conducting passageways of small volumetric content are provided from the control valve stem 32 to the cylinder chambers to thereby nullify the effect of flexible conduits and the resiliency of long columns of hydraulic fluid and the incident flexibility and resiliency present therein which results in the nicety and accuracy of control possible with applicant's arrangement.

Sliding on the outer diameter portion of the collars 34 through 38, inclusive, are the mating port forming collars 63, 64, 65, 66, and 67 which are held against the abutment surface 68 of the valve sleeve 69 by the lock nut 70, the entire assembly, including the sleeve 69, being thus reciprocatable axially on the collars 34 through 38 held on the spindle 32. Exhaust ports 71 and 72 are formed between the respective collars 63 and 64 and 66 and 67 which communicate with annular grooves 73 and 74 which in turn exhaust through radial openings 75 and 76 formed in the valve sleeve 69 into the discharge or return chamber 77 formed in the portion 12a of the tool slide 12. The pressure supply ports 78 and 79 formed between the collars 64 and 65 and 65 and 66 communicate with the passageways 80 and 81 in the valve sleeve 69 which open into a bore 82 formed in an integral eccentric portion 69a of the valve sleeve 69.

In this bore 82 is nicely slidably mounted the pressure supply plunger 83 having a recessed annular groove 84 communicating through radial openings 85 with its axial passageway 86. The member 83 has a flanged end portion 87 against which a lock nut 88 carried in the cover plate 41 is tightened to rigidly secure the member 83 to this plate so that the valve sleeve 69 may slide relative to member 83 as a sliding movable fluid connection to at all times provide fluid pressure in the passageway 86 for the pressure supply ports 78 and 79 of the valve.

The pressure supply may be obtained from a suitable fluid pressure pump 89 receiving a supply through the suction line 90 from a fluid pressure reservoir 91 and delivering pressure through the line 92 to the passageway 86. A suitable pressure relief valve 93 connected through a line 94 to the pressure supply line 92 and discharging through a line 95 to the fluid reservoir 91 may be utilized to regulate the maximum predetermined desired pressure supplied in the line 92 and to the control valve. Discharge from the chamber 77 is received out through the discharge or exhaust opening 96 and the line 97 for return to the fluid reservoir 91.

Referring particularly to Figure 8, there is shown a specific series of dimensions for the collars 35, 36, 37, and the mating collars 64, 65, and 66 as showing one preferred form of embodiment of the control servo valve for the hydraulically operated duplicating attachment. While this specific illustration serves to show a preferred arrangement, it is understood that applicant is not limited in the exact dimensions there shown but utilizes this illustration as a means for explaining the particular operation of the control valve porting system. With the particular dimensions of the parts 35, 36, and 37 and 64, 65, and 66 as shown in Figure 8, the openings between the respective ports 48—72, 58—79, 57—78, and 47—71 when the valve is in neutral or intermediate position of nonmovement of the tool slide and cylinder 14 with respect to the piston 24 are respectively, one-thousandth, two-thousandths, two-thousandths, and one-thousandth of an inch, as marked on the drawing. The ports recited and the spacing dimensions indicated are formed by abutment surfaces 98 formed on the respective collars associated with the valve such as shown, for example, on the collar 66 in Figure 9 so as to provide a maximum flow of fluid around the entire diameter of the respective collars so that the minutest of movements of the valve sleeve 69 effects a rapid and major change in the flow of fluid between the respective ports.

With the valve sleeve 69 moved to the left from neutral position, Figure 8, a distance of travel one-thousandth of an inch will substantially close the intercommunication between the ports 47 and 71, so as to prevent rapid discharge of fluid from the chamber 30 of the cylinder while opening the orifice between the ports 57 and 78 a greater amount to increase the flow of fluid into this chamber 30. At the same time, the pressure input orifice between the ports 58 and 79 will be closed down to one-thousandth of an inch while the exhaust discharge from the cylinder chamber 31 will be opened to two-thousandths between the ports 48 and 72. As a result, pressure will increase in the chamber 30 and the flow will increase therein while discharge will be more rapid and pressure reduced in the chamber 31 with the result that the tool slide 12 will be fed toward the work. The opposite condition prevails when the valve sleeve 69 is moved in the opposite direction from neutral in which case greater pressure and supply will be applied in the chamber 31 while greater escape and lower pressure will be applied in the chamber 30 for retracting the tool slide.

Thus, by regulating the position of the valve sleeve 69, the tool slide can be automatically caused to follow any manipulation of the valve sleeve 69 in either direction or to maintain itself in a fixed position when the valve is held normally in a neutral position of balanced pressures in the chambers 30 and 31. It is to be noted that in the operation of the valve at all times is fluid flow taking place in through the supply ports 78 and 79 and discharging out through the exhaust ports 71 and 72 under any operating conditions even though these conditions vary greatly, depending upon the direction of movement of the valve so as to in this way maintain proper pressure supply and make up for leakage in any part of the hydraulic system between the control valve and the hydraulic cylinder and thereby always maintain an exact and positive control of the relative position of the cylinder and piston and the tool slide with respect to a work piece in the machine.

The valve sleeve 69 may be actuated in automatic duplicating or tracer control operation during the movement of the tool carrier upon which the attachment is mounted by means of a tracer finger 99 or stylus arm pivotally mounted on a suitable pin 100 carried in the bracket 101 attached to the cap 41 of the attachment by suitable screws 102. The upper portion of the stylus arm 99 engages a pin 103 carried in a suitable guide bushing 104 to engage the surface 105 of the valve sleeve 69 while, in the other end of the arm 99 is provided a stop screw 106 engaging against the surface 107 of the cover plate 41 to limit its outward counterclockwise swinging movement as shown in Figures 1, 7, and 8. A suitable stylus contact tip 99a engages a template 108 which is arranged to move relatively to the tip 99a during the machining operation to thereby actuate the arm 99 and the valve sleeve 69. A suitable bias spring 109 supported on a pin 110 carried in the housing portion 12a and abutting against the surface 111 of the valve sleeve 69 serves to normally move the valve sleeve when the tracer tip is released from the template in a position to automatically effect forward infeeding movement of the tool slide 12 toward the work for initially bringing the tracer tip into contact with the work template 108. Movement of the control valve in the opposite direction is limited by a stop screw 112 threaded at 113 in the housing 12a and locked in place by a lock nut 114 and abutting surface 111 serves to position the valve so it will never be moved so far as to completely close off the pressure supply orifice formed between the ports 57 and 78 and render the device inoperative.

As a result of this unique design there is provided extremely high sensitivity with a minimum of movement of the valve sleeve 69 and the tracer finger arm 99 resulting in a highly accurate and responsive duplicating tracer controlled tool slide for a machine tool or the like.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a fluid pressure operated tool slide, a control valve, comprising a valve spindle fixed in said tool slide, a series of collars fixed on said spindle, a member relatively movable to said spindle including cooperating collars fixed on said member and movable on said first mentioned series of collars to form intake and exhaust ports, a fluid pressure actuating cylinder on said tool slide and rigid conduit means interconnecting said valve with said cylinder, a source of fluid pressure connected to an inlet port for said valve fixed on said tool slide, and a sliding movable fluid connection between said inlet port and said movable valve member.

2. In a hydraulic control valve having a valve spindle, a series of port forming collars fixed on said spindle, a fluid pressure cylinder controlled by said valve, rigid fluid passageways between said spindle and said cylinder, a movable valve sleeve having a series of port forming collars operatively related to said first mentioned port forming collars on said spindle, and means for reciprocating said movable valve sleeve by a template.

3. In a hydraulic control valve having a valve spindle, a series of port forming collars fixed on said spindle, a fluid pressure cylinder controlled by said valve, rigid fluid passageways between said spindle and said cylinder, a movable valve sleeve having a series of port forming collars operatively related to said first mentioned port forming collars on said spindle, and means for reciprocating said movable valve sleeve, a source of fluid pressure and means including a sliding movable fluid pressure connection for applying said fluid to said movable member and ports formed by the port forming collars therein.

ARTHUR P. WATERSON.

REFERENCES CITED

The following references are of record in the file of this patent:

UNITED STATES PATENTS

| Number | Name | Date |
| --- | --- | --- |
| 1,016,167 | McCulloch | Jan. 30, 1912 |
| 1,642,193 | Banning | Sept. 13, 1927 |
| 2,016,931 | Richard | Oct. 8, 1935 |
| 2,101,712 | Johansen | Dec. 7, 1937 |
| 2,437,570 | Von Zelewsky | Mar. 9, 1948 |